(12) United States Patent
Liu et al.

(10) Patent No.: US 8,620,280 B2
(45) Date of Patent: Dec. 31, 2013

(54) DOWNLINK SINGLE-USER MULTI-CELL MIMO SYSTEMS FOR INTERFERENCE MITIGATION

(75) Inventors: Lingjia Liu, Plano, TX (US); Jianzhong Zhang, Irving, TX (US)

(73) Assignee: Samsung Electronics Co., Ltd. (KR)

(*) Notice: Subject to any disclaimer, the term of this patent is extended or adjusted under 35 U.S.C. 154(b) by 832 days.

(21) Appl. No.: 12/387,097

(22) Filed: Apr. 27, 2009

(65) Prior Publication Data
US 2010/0273492 A1    Oct. 28, 2010

(51) Int. Cl.
H04M 3/42   (2006.01)

(52) U.S. Cl.
USPC ............ 455/414.1; 455/414.2; 455/414.3; 455/414.4; 370/329

(58) Field of Classification Search
USPC ........... 455/435.1, 436–446, 404.1–414.4; 370/329, 535, 389, 392, 400–402, 370/259–269, 357–356, 546, 428; 709/223, 709/238, 230, 228
See application file for complete search history.

(56) References Cited

U.S. PATENT DOCUMENTS

| | | | |
|---|---|---|---|
| 6,728,233 B1* | 4/2004 | Park et al. | 370/342 |
| 7,281,174 B1* | 10/2007 | Tapp et al. | 714/701 |
| 7,512,091 B2* | 3/2009 | Seol et al. | 370/328 |
| 2003/0220102 A1* | 11/2003 | Kallio | 455/422.1 |
| 2004/0133907 A1* | 7/2004 | Rodriguez et al. | 725/14 |
| 2004/0179493 A1* | 9/2004 | Khan | 370/332 |
| 2006/0039493 A1* | 2/2006 | Mukkavilli et al. | 375/267 |
| 2007/0058647 A1* | 3/2007 | Bettis et al. | 370/401 |
| 2007/0086380 A1* | 4/2007 | Lim et al. | 370/329 |
| 2007/0280175 A1* | 12/2007 | Cheng et al. | 370/338 |
| 2007/0281633 A1* | 12/2007 | Papadopoulos | 455/101 |
| 2007/0286304 A1* | 12/2007 | Kim et al. | 375/267 |
| 2008/0192709 A1* | 8/2008 | Mikami et al. | 370/338 |

* cited by examiner

Primary Examiner — Kashif Siddiqui
Assistant Examiner — Marisol Fahnert

(57) ABSTRACT

A system and method for interference mitigation. The system and method includes a number of base stations configured to coordinate with each other to perform a joint transmission to one or more subscriber stations. The base stations allocate a portion of a frequency band for the joint transmission and jointly schedule the joint transmission. Further, the base stations are configured to select a common codebook or separate codebooks to perform the joint transmission. Thereafter, the joint transmission is performed wherein the one or more subscribers stations substantially simultaneously receive the joint transmission from each of the base stations.

26 Claims, 11 Drawing Sheets

|  | CELL 1 | CELL 2 |
|---|---|---|
| TIME 1 | $X_{11}$ | $X_{21}$ |
| TIME 2 | $-X_{21}^*$ | $X_{11}^*$ |

DOWNLINK SINGLE-USER MULTI-CELL MIMO SYSTEMS FOR INTERFERENCE MITIGATION

CROSS-REFERENCE TO RELATED APPLICATION(S) AND CLAIM OF PRIORITY

The present application is related to U.S. Provisional Patent No. 60/188,981, filed Aug. 14, 2008, entitled "DOWNLINK SINGLE-USER MULTI-CELL MIMO SYSTEMS FOR INTERFERENCE MITIGATION". Provisional Patent No. 60/188,981 is assigned to the assignee of the present application and is hereby incorporated by reference into the present application as if fully set forth herein. The present application hereby claims priority under 35 U.S.C. §119(e) to U.S. Provisional Patent No. 60/188,981.

TECHNICAL FIELD OF THE INVENTION

The present application relates generally to wireless communications and, more specifically, to interference mitigation in wireless communications networks.

BACKGROUND OF THE INVENTION

In a wireless communications network, multiple cells or base stations (also referred to as "eNBs") use frequency bands and standardized codebooks for preceding transmission to their respective user equipments (UEs), using multiple transmit antennas. A typical problem of this procedure occurs where several cells or base stations are serving their intended UEs while interfering with each other's signal. This scenario is called "inter-cell interference." Inter-cell interference constrains the throughput of the wireless network.

FIG. 1B illustrates an exemplary wireless network 100. In such example, base station (BS) 102 is the serving base station for subscriber station (SS) 116, e.g., communications to and from SS 116 are conducted through BS 102. BS 103 is the serving base station for SS 115, e.g., communications to and from SS 115 are conducted through BS 103. SS 116 is located in proximity to SS 115. Further, BS 102 is communicating with SS 116 using the same frequency band that BS 103 is using to communicate with SS 115. Therefore, SS 116 receives communications 140 from BS 102. However, SS 116 also receives communications 145 (e.g., interfering communications) from BS 103. Further, SS 115 receives communications 150 from BS 103. Additionally, SS 115 also receives communications (e.g., interfering communications not shown) from BS 102. Since SS 116 and SS 115 are in close proximity and using the same frequency band simultaneously, the communications between the subscriber stations, SS 116 and SS 115, and their respective base stations, BS 102 and BS 103, interfere with each other.

For example, SS 116 will report to BS 102 that SS 116 is experiencing high interference. BS 102 will then send an indication message to BS 103 requesting BS 103 to reduce the transmission power over particular resource blocks. In this sense, the interference from BS 103 to SS 116 can be reduced. However, for the case of where SS 115 is also a cell-edge user, reducing transmission power at BS 103 will result in poor performance at SS 115. Inter-cell interference coordination mainly focuses on assigning orthogonal spectrum resource to cell-edge UE's from adjacent cells to combat interference.

SUMMARY OF THE INVENTION

A subscriber station capable of receiving communications from a plurality of communications is provided. The subscriber station includes a transmitter configured to feedback channel related information to a plurality of cells. The subscriber station also includes a receiver configured to receive a coordinated joint transmission based on the channel related information from at least two cells.

A wireless communications network including a plurality of cells (e.g., base stations), each one of the cells capable of wireless communications with a plurality of subscriber stations is provided. At least two of the plurality of cells include a controller configured to communicate with another cell or base station via a connection and a transmission means. The two cells coordinate with each other to send a joint transmission to one or more of the plurality of subscriber stations.

A method for interference mitigation is provided. The method includes coordinating, by a first cell (e.g., base station), a joint transmission to at least one subscriber station. The method also includes allocating a portion of a frequency band for the joint transmission. Further, the method includes transmitting, by the first cell, the joint transmission at a substantially same time and frequency that the joint transmission is transmitted by a second cell to the at least one subscriber station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

With regard to the following description, it is noted that the LTE term "node B" is another term for "base station" used below. Further, the term "cell" is a logic concept that can represent a "base station" or a "sector" belongs to a "base station". In the present disclosure, "cell" and "base station" are used interchangeably to indicate the actual transmission units (may be "sector" or "base station" etc.) in the wireless system. Also, the LTE term "user equipment" or "UE" is another term for "subscriber station" used below.

Figure 1A:
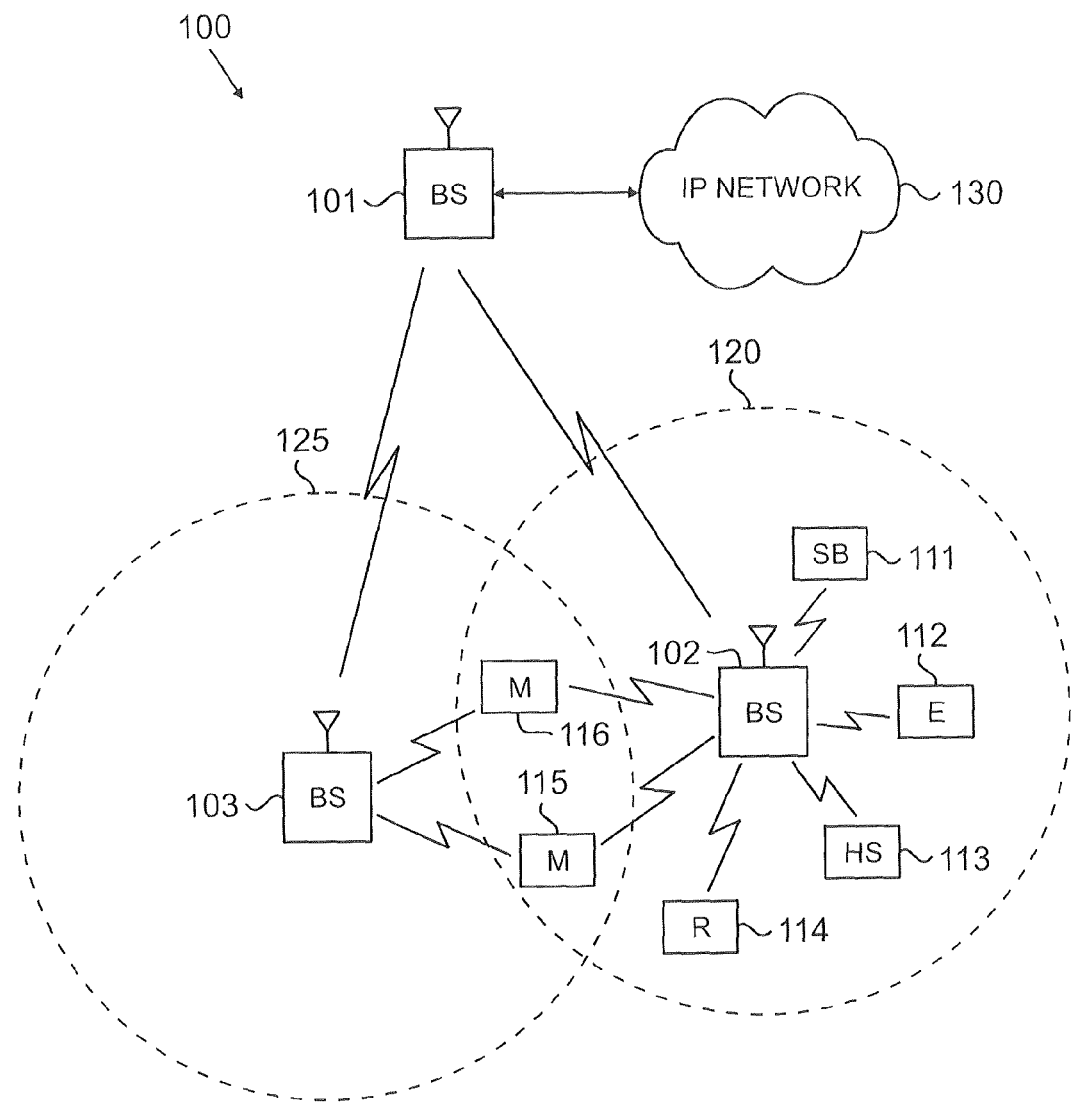
FIG. 1A illustrates exemplary wireless network 100 that is capable of decoding data streams according to an exemplary embodiment of the disclosure.

FIG. 1A illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet or other controller unit by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1A, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

Figure 1B:
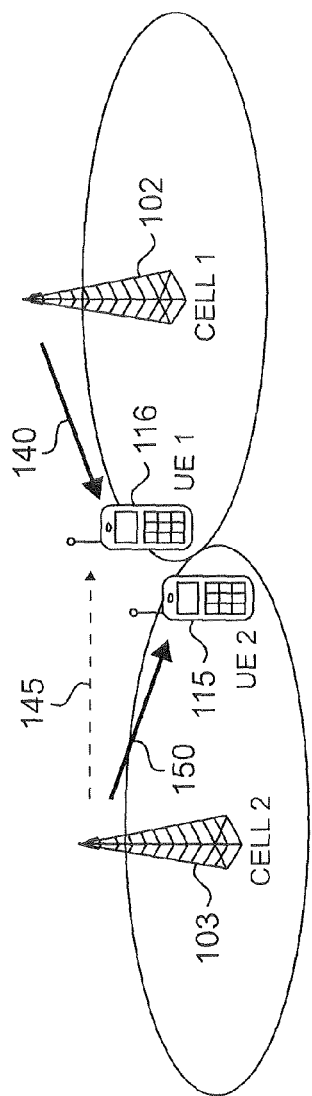
FIG. 1B illustrates exemplary wireless network 100 according to embodiments of the present disclosure.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1A. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
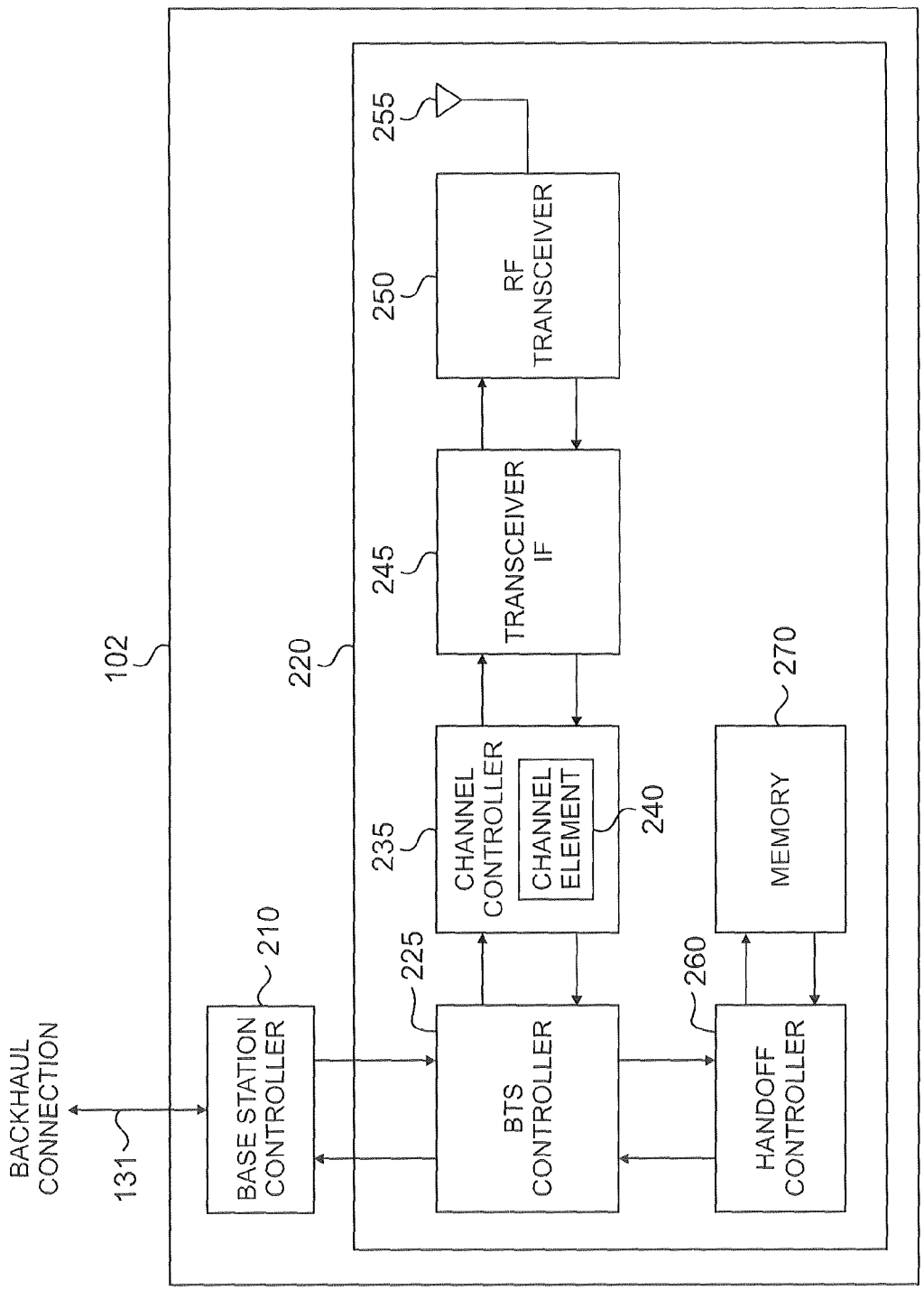
FIG. 2 illustrates exemplary base station in greater detail according to embodiments of the present disclosure.

FIG. 2 illustrates an exemplary base station in greater detail according to one embodiment of the present disclosure. The embodiment of base station 102 illustrated in FIG. 2 is for illustration only. Other embodiments of the base station 102 could be used without departing from the scope of this disclosure.

Base station 102 comprises base station controller (BSC) 210 and base transceiver subsystem (BTS) 220. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a handoff controller 260. The embodiment of handoff controller 260 and memory 270 included within BTS 220 is for illustration only. Handoff controller 260 and memory 270 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an advantageous embodiment of the present disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of the present disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of the present disclosure, BTS controller 225 is operable to store threshold parameters and in a memory 270. Memory 270 can be any computer readable medium, for example, the memory 270 can be any electronic, magnetic, electromagnetic, optical, electro-optical, electromechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM).

BSC 210 is operable to maintain communications between BS 102 and BS 101 and BS 103. BS 102 communicates to BS 101 and BS 103 via the wireless connection 131. In some embodiments, the wireless connection 131 is wire-line connection.

Figure 3:
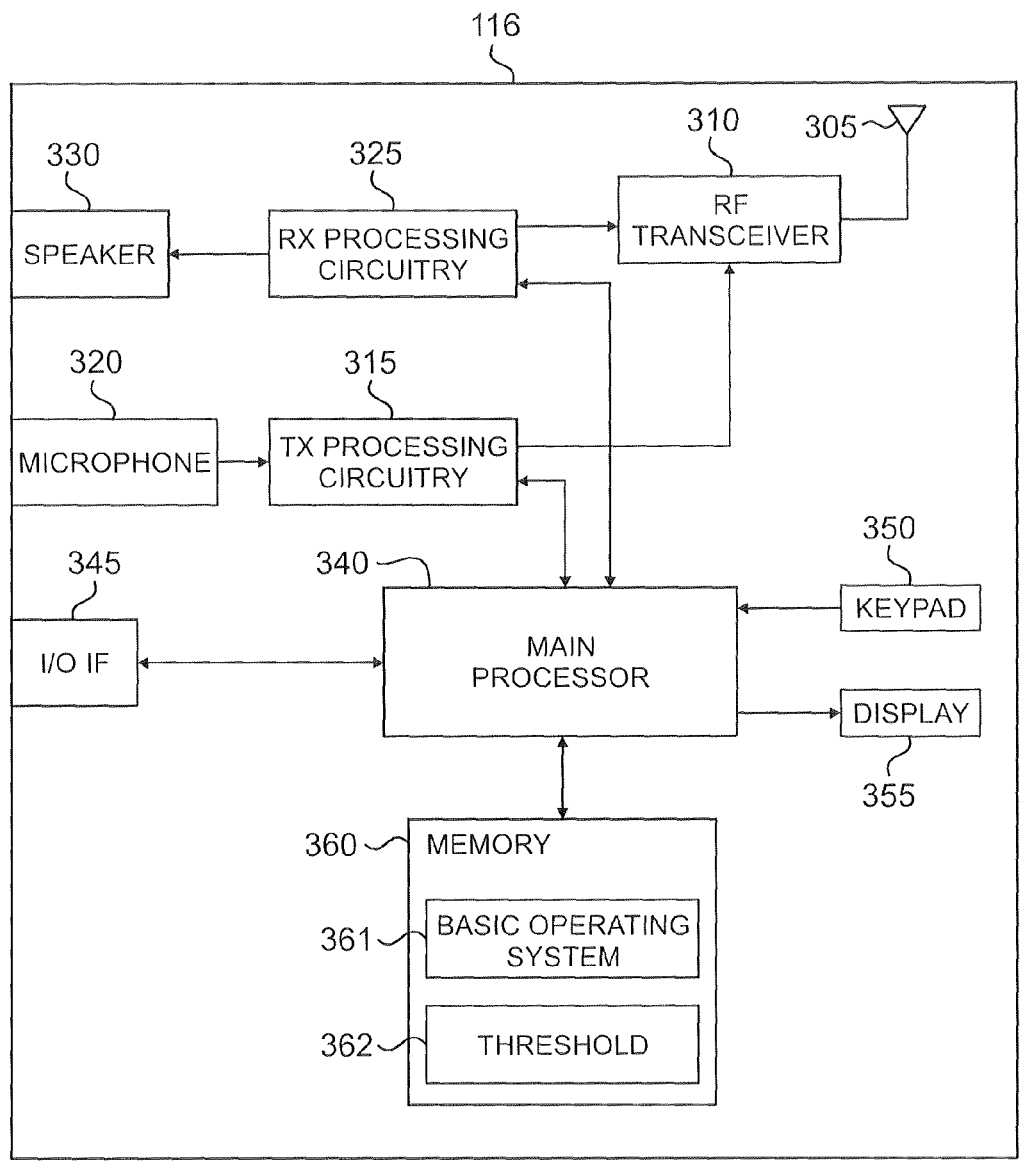
FIG. 3 illustrates an exemplary wireless mobile station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a preconfigured threshold 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. In some embodiments, the main processor 340 is configured to vary the preconfigured threshold 362. The main processor 340 can vary the threshold based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Figure 4:
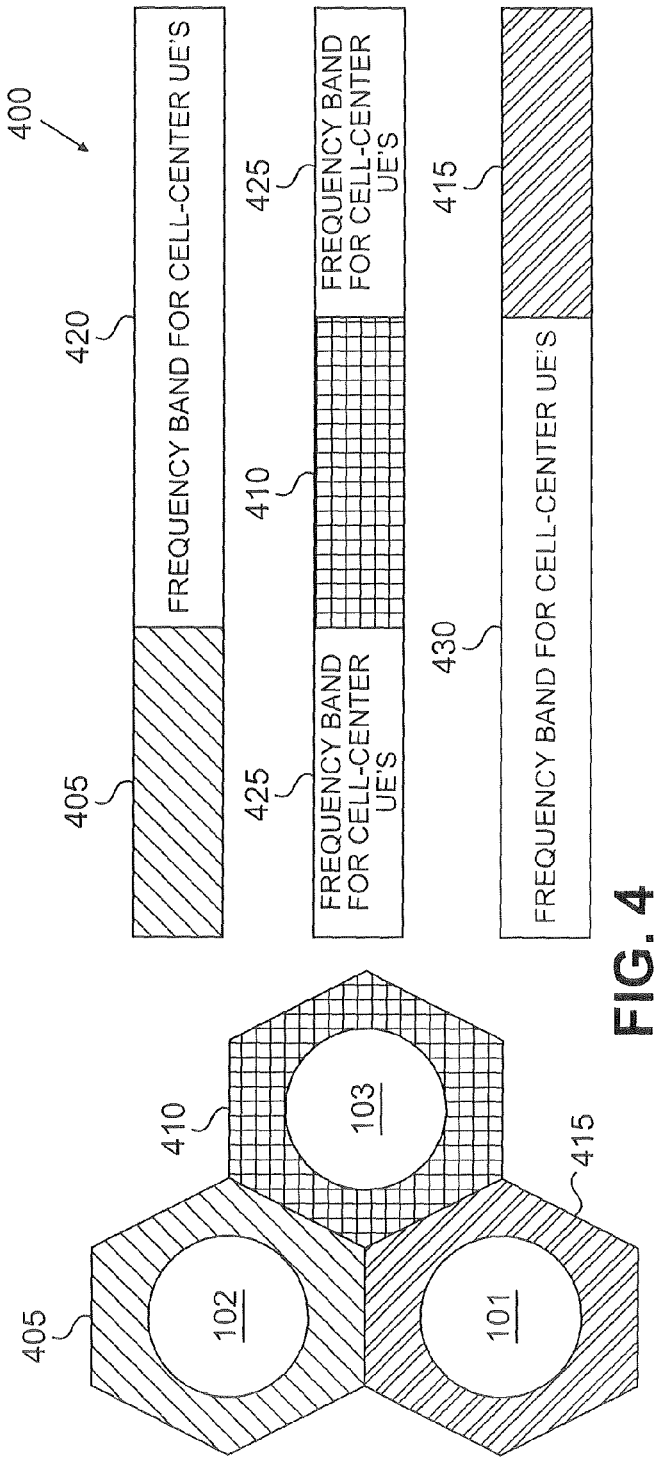
FIG. 4 illustrates a system spectrum allocation for a three-cell system according to embodiments of the present disclosure.

FIG. 4 illustrates a system spectrum allocation for a three-cell system according to embodiments of the present disclosure. The embodiment of the system spectrum allocation shown in FIG. 4 is for illustration only. Other embodiments of the system spectrum allocation for a three-cell system could be used without departing from the scope of this disclosure.

The three cells, BS 101, BS 102 and BS 103 are adjacent to each other and interfering with each other. The three disjointed frequency sets 405, 410, 415 (different cross-hash sets in FIG. 4) are reserved to the cell-edge UEs while the remaining frequency 420, 425, 430 is used for the cell-center UEs. For example, BS 102 uses a first frequency band 405 for its cell-edge UEs while allocating the remaining frequency band 420 to its cell-center UEs. BS 103 uses a first frequency band 405 for its cell-edge UEs while allocating the remaining frequency band 425 to its cell-center UEs. BS 101 uses a first frequency band 415 for its cell-edge UEs while allocating the remaining frequency band 430 to its cell-center UEs. In this way, the cell-edge UEs will not experience severe inter-cell interference from other cells. However, this may reduce the frequency reuse factor which results in an inefficiency way of utilizing the frequency resource. Interference mitigation through PMI coordination focuses on reducing interference by recommending the interfering cell to use the preceding matrix which will create no or small interference to the reporting UE, e.g., SS 116.

Embodiments of the present disclosure provide joint processing from multiple cells. Joint processing from multiple cells not only avoids the interference but also turns the interference into useful signals. Joint processing is particularly favourable for cell-edge users where the interference is relatively strong compared to the received signal.

Figure 5:
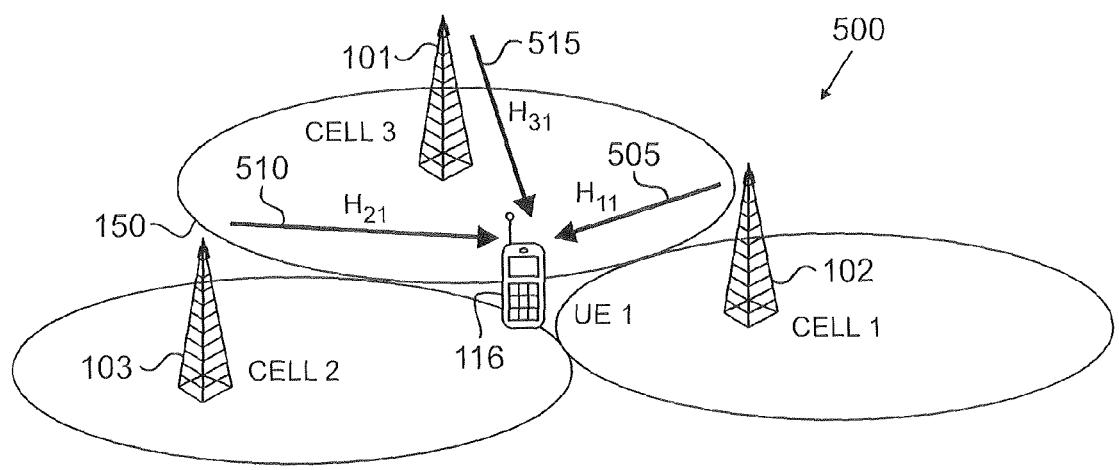
FIG. 5 illustrates a joint transmission according to embodiments of the present disclosure.

FIG. 5 illustrates a joint transmission according to embodiments of the present disclosure. The embodiment of the joint transmission 500 shown in FIG. 5 is for illustration only. Other embodiments of the joint transmission could be used without departing from the scope of this disclosure.

In single point transmission each UE, such as SS 116, receives a transmission from one base station, such as BS 102. In the joint transmission 500, SS 116 receives the same data from more than one base station, such as from BS 102, BS 103 and BS 101. Each base station, e.g., BS 102, BS 103 and BS 101, in a joint transmission, sends information to SS 116 using the same frequency band. SS 116 substantially simultaneously receives the data transmissions from the BS 102, BS 103 and BS 101. SS 116 is able to combine the three transmissions and retrieve the data. This multi-cell version of single-user MIMO system is performed for SS 116 (e.g., the cell-edge UE) where the received signal to interference plus noise ratio is small.

In FIG. 5, BS 102 (e.g., "Cell 1") is the actual serving cell for SS 116. BS 103 (e.g., "Cell 2") and BS 101 (e.g., "Cell 3") are strong interference cells to SS 116. $H_{i1}$ corresponds to the wireless channel from "Cell i" to SS 116. Accordingly, $H_{11}$ 505 corresponds to the wireless channel from BS 102 to SS 116; $H_{21}$ 510 corresponds to the wireless channel from BS 103 to SS 116; and $H_{31}$ 515 corresponds to the wireless channel from BS 101 to SS 116. When in the joint processing mode, BS 102, BS 103 and BS 101 jointly process SS 116's information together. BS 102, BS 103 and BS 101 send SS 116's information over the air to SS 116 simultaneously through the wireless channels. By doing this, the interference is greatly reduced while the received power (sum from the three cells BS 102, BS 103 and BS 101) is greatly improved.

Figure 6:
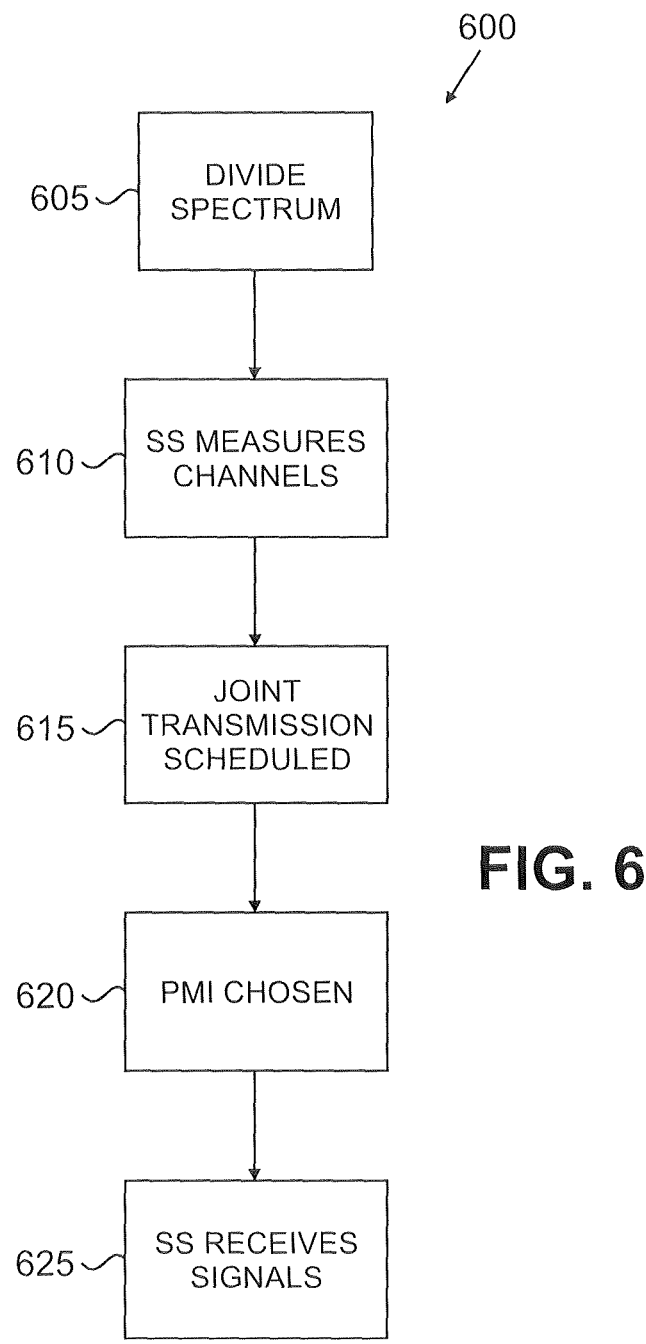
FIG. 6 illustrates a process for establishing a joint transmission according to embodiments of the present disclosure.

FIG. 6 illustrates a process for establishing a joint transmission according to embodiments of the present disclosure. The embodiment of the process for establishing a joint transmission 600 shown in FIG. 6 is for illustration only. Other embodiments of the process for establishing a joint transmission 600 could be used without departing from the scope of this disclosure.

In step 605, the spectrum of each base station is divided into several sets. The frequency bandwidth spectrum is divided into sets, dedicating (e.g., allocating) a set to joint processing. The different sets of the spectrum resource are utilized for different types of users. The portion of the frequency bandwidth dedicated to joint processing is referred to as the multi-cell joint transmission spectrum set 705 (also referred herein as the frequency band for joint transmission or joint transmission band). In some embodiments, the sets are disjointed. In such embodiments, the multi-cell joint transmission spectrum set 705 is dedicated only to joint processing. One set 710 of the spectrum can be used for cell-center UEs and another set (not specifically illustrated) can be used for cell-edge UEs. Among the sets of spectrum 700, one particular set, the multi-cell joint transmission spectrum set 705, is common to all the adjacent cells (BS 102, BS 103 and BS 101) is reserved for multi-cell joint transmission. The size of the multi-cell joint transmission spectrum set 705 can be fixed or flexible depending on the system configuration. For example, the multi-cell joint transmission spectrum set 705 is flexible when the set of the frequency resource used for multi-cell joint transmission is jointly decided by BS 102, BS 103 and BS 101 based on the traffic load of the cell-edge users. On the other hand, a fixed portion (i.e., the multi-cell joint transmission spectrum set 705) of the spectrum set can be reserved for multi-cell joint transmission.

In some embodiments, the sets 705, 710 overlap each other. In such embodiments, BS 102 can assign a portion of the multi-cell joint transmission spectrum set 705 for use in transmitting to cell-center UE's. When assigning a portion of the multi-cell joint transmission spectrum set 705 to a cell-center UE, BS 102 reduces a power output to the cell-center UE in order to avoid interference with the signal to the cell-edge UE.

Figure 7:
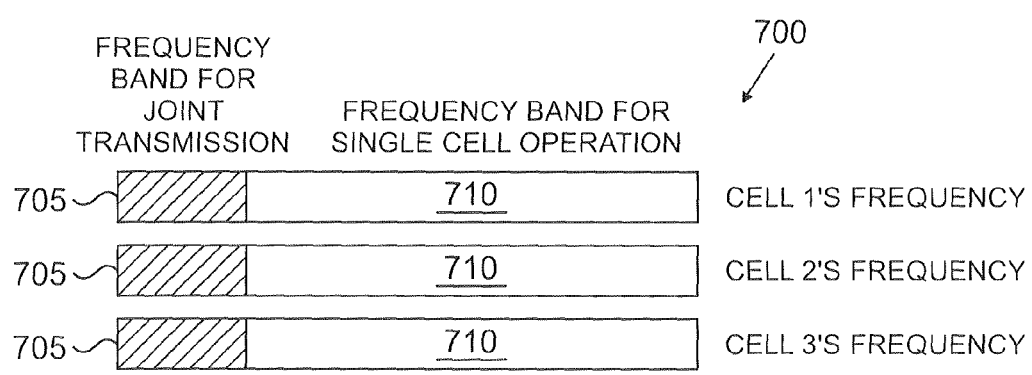
FIG. 7 illustrates a frequency allocation for joint transmission on top of Inter-cell Interference Coordination (ICIC) according to embodiments of the present disclosure.

The assignment of the multi-cell joint transmission spectrum set 705 can be created on top of current spectrum 700 allocation schemes. For example, in FIG. 7 illustrates a multi-cell joint transmission frequency set 705 allocation on top single cell frequency allocation. The embodiment of the multi-cell joint transmission frequency set 705 allocation shown in FIG. 7 is for illustration only. Other embodiments of the multi-cell joint transmission frequency set 705 allocation could be used without departing from the scope of this disclosure.

As illustrated in FIG. 7, the multi-cell joint transmission frequency set 705, which is common for all the three cells (BS 102, BS 103 and BS 101), is used for joint transmission while the remaining sets 710 are used for individual cell scheduling.

In some embodiments, a semi-statistical configuration of the frequency bands for joint transmission is utilized (e.g., a semi-statistical configuration is used to allocate the multi-cell joint transmission frequency set 705). Furthermore, the multi-cell joint transmission frequency set 705 can be configured based on traffic of different cells and the quality of service requirements for the traffic. In such embodiments, BS 102, BS 103 and BS 101 are configured to dynamically change the multi-cell joint transmission frequency set 705 allocation. BS 102, BS 103 and BS 101 can change the multi-cell joint transmission frequency set 705 allocation at specified intervals, such as, but not limited to, each time slot. Additionally and alternatively, the multi-cell joint transmission frequency set 705 allocation can be fixed for a frame or longer.

In one example, the multi-cell joint transmission frequency set 705 is created by reserving a basic portion of the frequency band 700 for joint transmission. This system parameter (the multi-cell joint transmission frequency set 705) can be fixed as configured by the higher layer. However, a small fraction of the frequency band 700 can be added into the multi-cell joint transmission frequency set 705 if the traffic load increases or the quality of service requirements increase. Otherwise, the remaining portion 710 of the bandwidth is used for other cell-edge UEs or cell-center UEs.

In some embodiments, the semi-statistically configured multi-cell joint transmission frequency set 705 is also incorporated with interference mitigation through power control. In such embodiments, cell-center UEs from an interfering cell are not prohibited from receiving signals in the joint transmission band 705 (e.g., the sets 705, 710 may overlap as discussed herein above), however the transmit power for the cell-center UEs in the interfering cell are maintained below a certain target threshold. As such, an additional fraction of the multi-cell joint transmission frequency set 705 can be extracted from the frequency bands 700 for the cell-center UEs.

In step 610, SS 116 measures the channels from multiple cells. SS 116 estimates the received signal to interference and noise ratio (SINR). Additionally and alternatively, SS 116 may estimate, or determine, some other performance measure. If the SINR, or other performance measure, is below the preconfigured threshold 362, SS 116 classifies itself as a cell-edge UE. The preconfigured threshold 362 can be configured by BS 102 or at SS 116. Once classified as a cell-edge UE, SS 116 sends a request for the multi-cell joint transmission.

For example, if the preconfigured threshold 362 is configured at BS 102, SS 116 only needs to feedback the wideband channel quality indicator (CQI), or the other performance measures. BS 102 is then operable to decide whether or not to do multi-cell joint transmission based on the reported performance measure. If BS 102 decides to do the multi-cell joint transmission, SS 116 is required to report the cell IDs, together with the channel knowledge (Channel Quality Information (CQI) together with PMI) from all the strong interfering cells (e.g., BS 103 and BS 101). Additionally, SS 116 may feedback the estimated channel knowledge information, $H_{11}$, $H_{21}$ and $H_{31}$ to BS 102, where $H_{11}$, $H_{21}$ and $H_{31}$ are the estimated channel gains from BS 102, BS 103 and BS 101 respectively. The estimated channel knowledge can be in terms of a PMI of a joint codebook considering all the channels or a set of PMIs with each of them corresponds to a wireless channel.

In some embodiments, SS 116 chooses to feedback the PMI's jointly. For example, a joint codebook can be designed and made available at all the cells (e.g., at BS 102, BS 103 and BS 101). After estimating the channels, SS 116 selects one or more PMIs out of the joint codebook and feeds it back to the base station, say BS 102.

In additional and alternative embodiments, SS 116 may choose the PMIs for the base stations in a distributed fashion. In such embodiments, a separate codebook is used for each respective transmission in the joint transmission. SS 116 chooses to feedback the PMI for each base station. For example, SS 116 may choose to feedback the PMI for BS 102 from the codebook that maximizes its own received SINR from BS 102, or some other performance measures. Additionally, SS 116 may choose to feedback the PMI for BS 103 from the codebook that maximizes its own received SINR from BS 103, or some other performance measures. Further, SS 116 may choose to feedback the PMI for BS 101 from the codebook which maximizes its own received SINR from BS 101, or some other performance measures. In such embodiments, a joint codebook design is not required. Further, SS 116 feeds back the PMI for each cell which maximizes its own received signal strength.

In some embodiments, SS 116 sends the estimated channel gains $H_{11}$, $H_{21}$ and $H_{31}$ wirelessly to one or more of the base stations, e.g., to one or more of BS 102, BS 103 and BS 101. For example, $H_{21}$ can be sent to BS 103 directly from SS 116 while $H_{31}$ can be sent to BS 101 directly from SS 116.

Thereafter, BS 102 exchanges SS 116's data through the connection 131 to BS 103 and BS 101. BS 102 can also exchange the channel knowledge information via the connection 131.

In some embodiments, if the preconfigured threshold 362 is configured at SS 116, then SS 116 will send out requests for multi-cell joint transmission and cell IDs together with channel knowledge for the strong interfering cells. This information again is exchanged through the connection 131 among BS 102, BS 103 and BS 101, which will perform the multi-cell joint transmission.

In step 615, the joint transmission is scheduled. After receiving the information from SS 116, BS 102, BS 103 and BS 101 coordinate and jointly schedule SS 116 in the multi-cell joint transmission spectrum set 705. Various scheduling schemes can be implemented including, but not limited to, proportional fairness, round robin, and opportunistic beam-forming, etc. Once SS 116 is scheduled for joint transmission, a corresponding system resource is also determined. For example the size and location of the physical resource blocks are then decided.

In step 620, a preceding matrix is chosen. BS 102, BS 103 and BS 101 choose the corresponding preceding matrices for their downlink transmissions to SS 116 separately or jointly.

In step 625, SS 116 receives signals from each of BS 102, BS 103 and BS 101 simultaneously. SS 116 uses various ways to combine the signal at the receiver. The received signal $Y_1$ at SS 116 can be expressed by Equation 1:

$$Y_1 = [H_{11}\ H_{21}\ H_{31}] \cdot \begin{bmatrix} P_1 \\ P_2 \\ P_3 \end{bmatrix} x + N_1 = \quad \text{[Eqn. 1]}$$

$$H_{11}P_1 x + H_{21}P_2 x + H_{31}P_3 x + N_1.$$

In Equation 1, $P_i$ is the preceding vector of Cell i, x is the transmitted signal at the cells and $N_1$ is the Additive White Gaussian Noise (AWGN) at the receiver of SS 116.

Figure 8A:
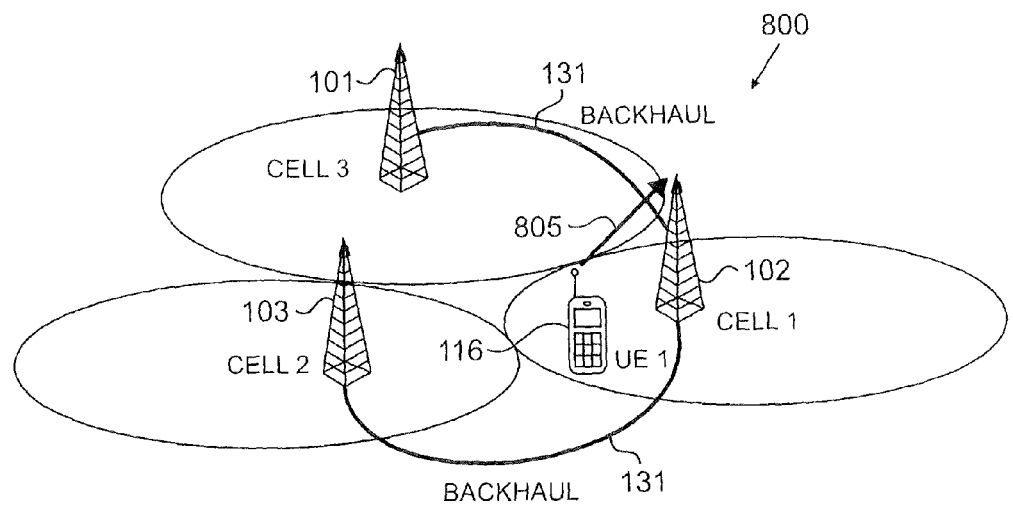
FIGS. 8A and 8B illustrate a joint transmission according to embodiments of the present disclosure.
Figure 8B:
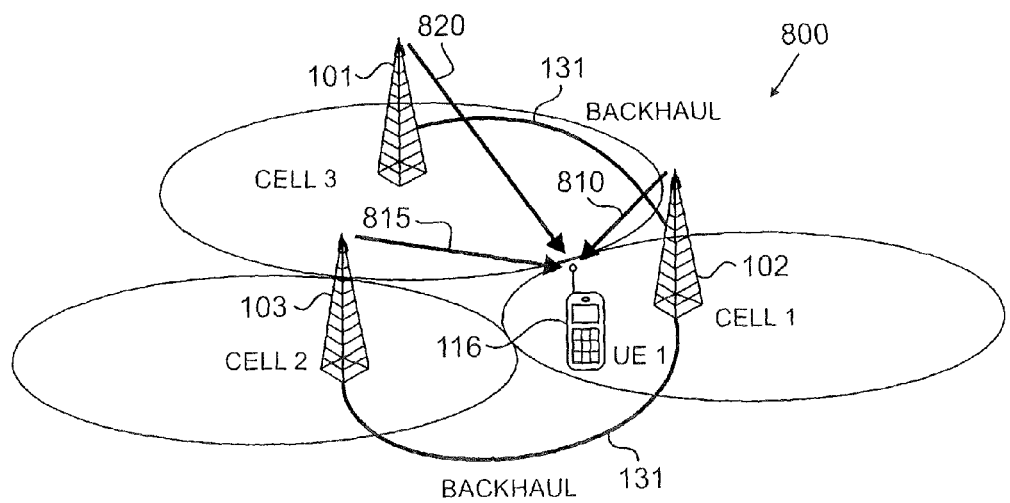

FIGS. 8A and 8B illustrate a joint transmission according to embodiments of the present disclosure. The embodiments of the joint transmission 800 shown in FIGS. 8A and 8B are for illustration only. Other embodiments of the joint transmission 800 could be used without departing from the scope of this disclosure.

SS 116 is served by BS 102. Accordingly, BS 102 is the serving base station for SS 116. SS 116 is operating at the edge of the cell for BS 102. SS 116 may be stationary or may have moved from a cell-center area of BS 102's cell to the cell-edge for BS 102. SS 116 is able to determine that it is at a cell-edge adjacent to the cells for BS 103 and BS 101. SS 116 determines that it is at a cell-edge, and as such, that it is a cell-edge UE by measuring the channels from BS 103 and BS 102. If the results of SS 116's measures fall below the preconfigured threshold 362, SS 116 sends a joint transmission request message 805 to BS 102. The request message 805 includes CQI information, or some other performance measure. In response, BS 102 determines whether or not to a joint transmission should be performed. If BS 102 determines that a joint transmission should not be performed, BS 102 executes other interference mitigation techniques if necessary. If BS 102 determines that a joint transmission should occur, SS 116 reports the cell IDs for BS 103 and BS 101 together with the CQI information, or some other performance measure. Channel knowledge related information including a joint Precoding Matrix Indicator (PMI) of a common codebook or separate PMIs of separate codebooks for each base station based on maximizing each base station's own received signal strength also are reported. Thereafter, BS 102 exchanges data for SS 116 with BS 103 and BS 101. The data for SS 116 is exchanged by BS 102 via the connection 131 to each of BS 103 and BS 101. BS 102, BS 103 and BS 101 coordinate and establish a scheduling scheme to jointly schedule the joint transmission. Any number of scheduling schemes can be implemented including, but not limited to, proportional fairness, round robin, and opportunistic beam forming. Thereafter, BS 102, BS 103 and BS 101 choose preceding matrices. BS 102, BS 103 and BS 101 may choose a common preceding matrix or BS 102, BS 103 and BS 101 may choose separate preceding matrices. Then, BS 102, BS 103 and BS 101 commence the joint transmission to SS 116. SS 116 simultaneously receives signals 810, 815, 820 from BS 102, BS 103 and BS 101 respectively.

In some embodiments, a fixed number of base stations may enter the joint transmission mode. In such embodiments, a base station configure value N is provided. The base station configures value N is the number of base stations participating in the joint transmission mode. The base station configures value N may be preset or varied by the base station. In some embodiments, BS 102 communicates the base station configure value N to SS 116. Then, SS 116 reports the related information of the N−1 strongest interfering base stations.

In such embodiments, the maximum number of base stations that may participate in the joint transmission is N. However, any number of base stations less than or equal to N (i.e., number of base stations ≤N) can participate in the joint transmission. For example, if N is five (5), then up four (4) base stations may participate in the joint transmission. However, SS 116 only repots related information of two interfering base stations. After SS 116 requests the joint transmission and BS 102 determines that a joint transmission should be performed, BS 102 and the two base stations (e.g., BS 101 and BS 103) coordinate and execute the joint transmission. Further, since N equals four (4), then N−1 equals three (3). As such, SS 116 could report up to three (3) interfering base stations (e.g., the three strongest interfering base stations) to BS 102. If SS 116 reports three (3) interfering base stations, then those three interfering base stations, along with BS 102 would coordinate to perform the joint transmission. Therefore, four base stations (e.g., BS 102 and three interfering base stations) would perform the joint transmission. In another example, SS 116 detects five interfering base stations. In such example, SS 116 reports the three strongest interfering base stations only. Thereafter, BS 102 would coordinate with the three strongest interfering base stations to perform the joint transmission. Therefore, four base stations (e.g., BS 102 and the three strongest interfering base stations) would perform the joint transmission.

In additional embodiments, a flexible number of base stations may enter the joint transmission mode. In such embodiments, SS 116 reports the related information of the n strongest interfering cells. The determination of n can be based on various criteria. For example, SS 116 can determine n based on the received signal strength and/or some other performance measures. In one example, SS 116 sets a threshold of the ratio between the received signal strength from interference cell and that from BS 102 (e.g., the serving cell). Then n becomes the number of interfering cells which has received signal strength greater than the threshold.

Furthermore, in some embodiments, the base stations participating in the joint transmission may vary to be any number of base stations less than or equal to n (number of base stations ≤n). However, in such embodiments, the base stations selected for participating in the joint transmission are only those base stations originally identified as interfering base stations. Accordingly, the base stations participating in the joint transmission are selected from the original identified set as long as the number of base stations is less than or equal to n.

In some embodiments, the feedback information in step 605 is constructed based on the difference between the feedback information for various cells. To be specific, for the case of individual codebook selection as described in Step 620, SS 116 feeds back the CQIs and the PMIs for each base station that participates in the joint transmission. For the CQIs of the base stations (e.g., BS 103 and BS 101) other than the serving cell (e.g., BS 102), SS 116 only feeds back the difference between the corresponding CQI and the CQI for the serving cell (e.g., BS 102).

Figures 9, 13:
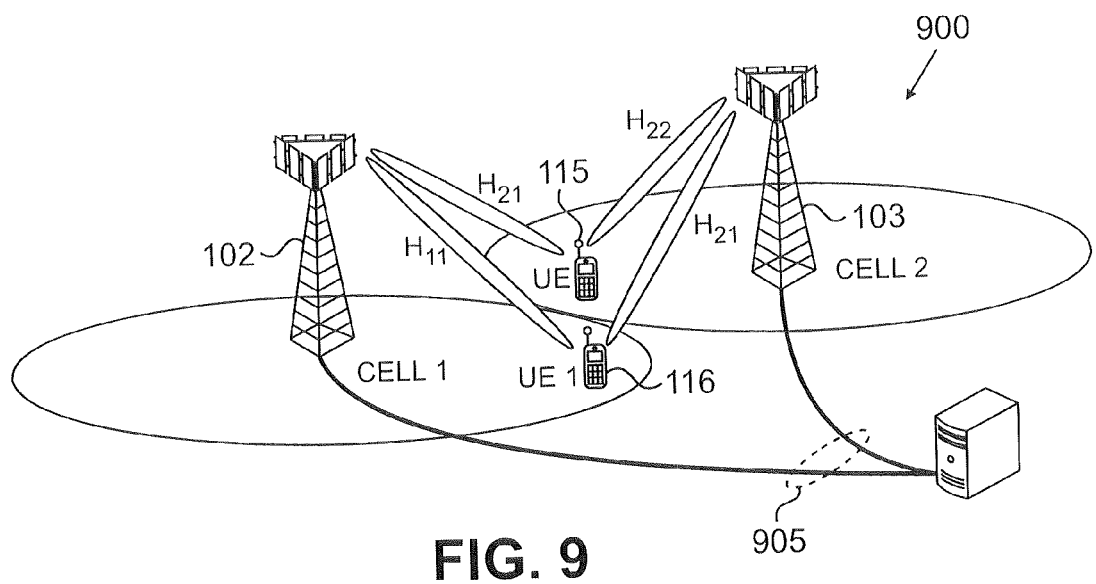
FIG. 9 illustrates a Multi-User Multi-Cell System (MUMCS) Model according to embodiments of the present disclosure.
FIG. 13 is a matrix function according to embodiments of the present disclosure.

FIG. 9 illustrates a Multi-User Multi-Cell System (MUMCS) Model 900 according to embodiments of the present disclosure. The embodiment of the MUMCS Model 900 shown in FIG. 9 is for illustration only. Other embodiments of the MUMCS Model 900 could be used without departing from the scope of this disclosure.

SS 116 is served by BS 102. As such BS 102 is SS 116's serving base station (e.g., BS 102's serving UE is SS 116). SS 115 is served by BS 103. As such, BS 103 is SS 115's serving base station (e.g., BS 103's serving UE is SS 115). The data for both SS 116 and SS 115 are shared between the two cells BS 102 and BS 103 through a high speed connection 905. Both of SS 116 and SS 115 are cell-edge UEs. SS 116 and SS 115 have similar received signal strength from both of BS 102 and BS 103. $H_{11}$ and $H_{12}$ denote the channel gains from BS 102 to SS 116 and SS 115 respectively while $H_{21}$ and $H_{22}$ denote the channel gains from BS 103 to SS 116 and SS 115 respectively.

Figure 10:
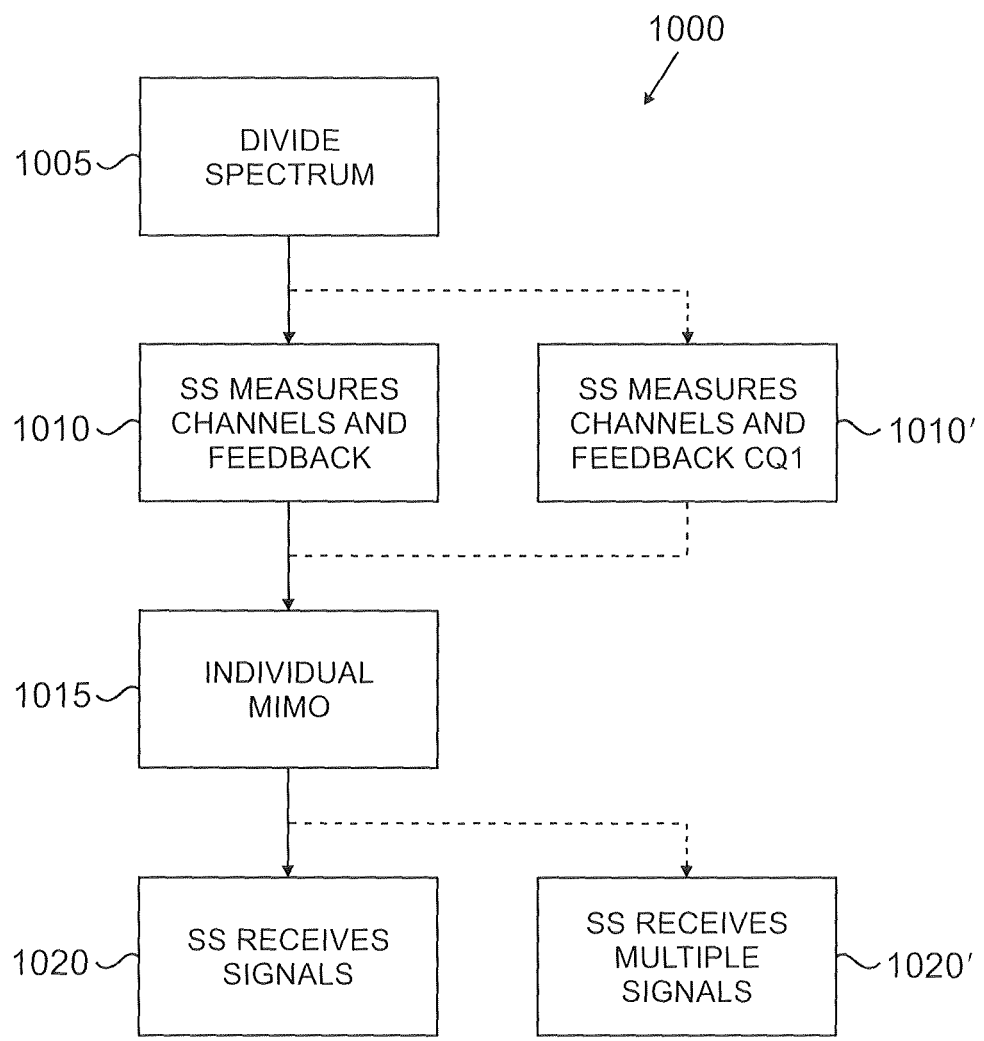
FIG. 10 illustrates a process for establishing a MUMCS joint transmission according to embodiments of the present disclosure.

FIG. 10 illustrates a process for establishing a MUMCS joint transmission according to embodiments of the present disclosure. The embodiment of the process for establishing the MUMCS joint transmission 1000 shown in FIG. 10 is for illustration only. Other embodiments of the process for establishing the MUMCS joint transmission 1000 could be used without departing from the scope of this disclosure.

In step 1005, the spectrum of each base station, BS 102 and BS 103, is divided into several sets. The frequency bandwidth spectrum is divided into sets, dedicating (e.g., allocating) a set to joint processing. The portion of the frequency bandwidth is dedicated to joint processing is referred to as the multi-cell joint transmission spectrum set. In some embodiments, the sets are disjointed. In such embodiments, the multi-cell joint transmission spectrum set is dedicated only to joint processing. One set of the spectrum can be used for cell-center UEs and another set can be used for cell-edge UEs. Among the sets of spectrum, one particular set, common to all the adjacent cells (BS 102 and BS 103) is reserved for multi-cell joint transmission. The size of the multi-cell joint transmission spectrum set can be fixed or flexible depending on the system configuration. For example, the multi-cell joint transmission spectrum set is flexible when the set of the frequency resource used for multi-cell joint transmission is jointly decided by BS 102 and BS 103 based on the traffic load of the cell-edge users. On the other hand, a fixed portion of the spectrum set can be reserved for multi-cell joint transmission.

In some embodiments, the sets overlap each other. In such embodiments, BS 102 can assign a portion of the multi-cell joint transmission spectrum set for use in transmitting to cell-center UE's. When assigning a portion of the multi-cell joint transmission spectrum set to a cell-center UE, BS 102 reduces a power output to the cell-center UE in order to avoid interference with the signal to the cell-edge UE.

In step 1010, SS 116 measures the channels from the multiple cells. SS 116 estimates the received SINR. Additionally and alternatively, SS 116 estimates some other performance measures. If the SINR, or other performance measures, is below the preconfigured threshold 362, SS 116 classifies itself as a cell-edge UE. Once classified as a cell-edge UE, SS 116 sends a request message to BS 102 for multi-cell joint transmission. The preconfigured threshold 362 can be configured at BS 102 or at SS 116. If the threshold is configured at BS 102, SS 116 only feeds back the wideband CQI, or other performance measures. BS 102 then decides whether or not to do multi-cell joint transmission based on the reported performance measure. If BS 102 decides to do the multi-cell joint transmission, SS 116 reports the base station IDs (e.g., cell IDs), together with the estimated channel knowledge for each link (CQI together with PMI) from all the strong interfering cells.

In one example, SS 116 feeds back the estimated channel knowledge information related to $H_{11}$ and $H_{21}$ to BS 102. Additionally, SS 115 feeds back the estimated channel knowledge information related to $H_{12}$ and $H_{22}$ to BS 103.

The estimated channel knowledge, or the channel knowledge information related to the wireless links, can also be directly feedback from the UEs to base stations through the air. For example, channel knowledge information related to $H_{21}$ can be directly feedback from SS 116 to BS 103 while channel knowledge information related to $H_{12}$ can be directly feedback from SS 115 to BS 102. Data for SS 116 and data for SS 115 are then exchanged through the connection 905 to the other base stations as well as the channel knowledge information.

Additionally and alternatively, if the preconfigured threshold 3620 is configured at SS 116, then SS 116 will send out requests for multi-cell joint transmission and cell IDs together with channel knowledge for the strong interfering cells. This information is exchanged through the connection 905 among the cells which will perform the multi-cell joint transmission (e.g., the information is exchanged between BS 102 and BS 103).

In step 1015, after receiving the data and the information related to channel knowledge, BS 102 and BS 103 each perform individual multi-user MIMO. Each base station treats the UEs reporting to it as a serving UEs. For example, BS 102 treats both SS 116 and SS 115 as a serving UEs. BS 102 performs multi-user spatial multiplexing within the set of SS 116 and SS 115. Additionally BS 103 treats both SS 116 and SS 115 as a serving UEs. BS 103 performs multi-user spatial multiplexing within the set of the SS 116 and SS 115.

In step 1020, SS 116 receives signals from BS 102 and BS 103 simultaneously. Since the data is shared between BS 102 and BS 103 for each UE, SS 116 is receiving multiple streams from multiple base stations. The fact that UEs, such as SS 116 and SS 115, have multiple receive antennas enables the spatial multiplexing from multiple base stations simultaneously. The received signal $Y_1$ at SS 116 can be expressed by Equation 2:

$$Y_1 = H_{11}P_{11}x_{11} + H_{21}P_{21}x_{21} + H_{12}P_{12}x_{12} + H_{22}P_{22}x_{22} + N_1 \qquad \text{[Eqn. 2]}$$

In Equation 2, $x_{11}$ and $x_{21}$ are the intended signals for SS 116. Further, $x_{12}$ and $x_{22}$ are the intended signals for SS 115.

Figure 11:
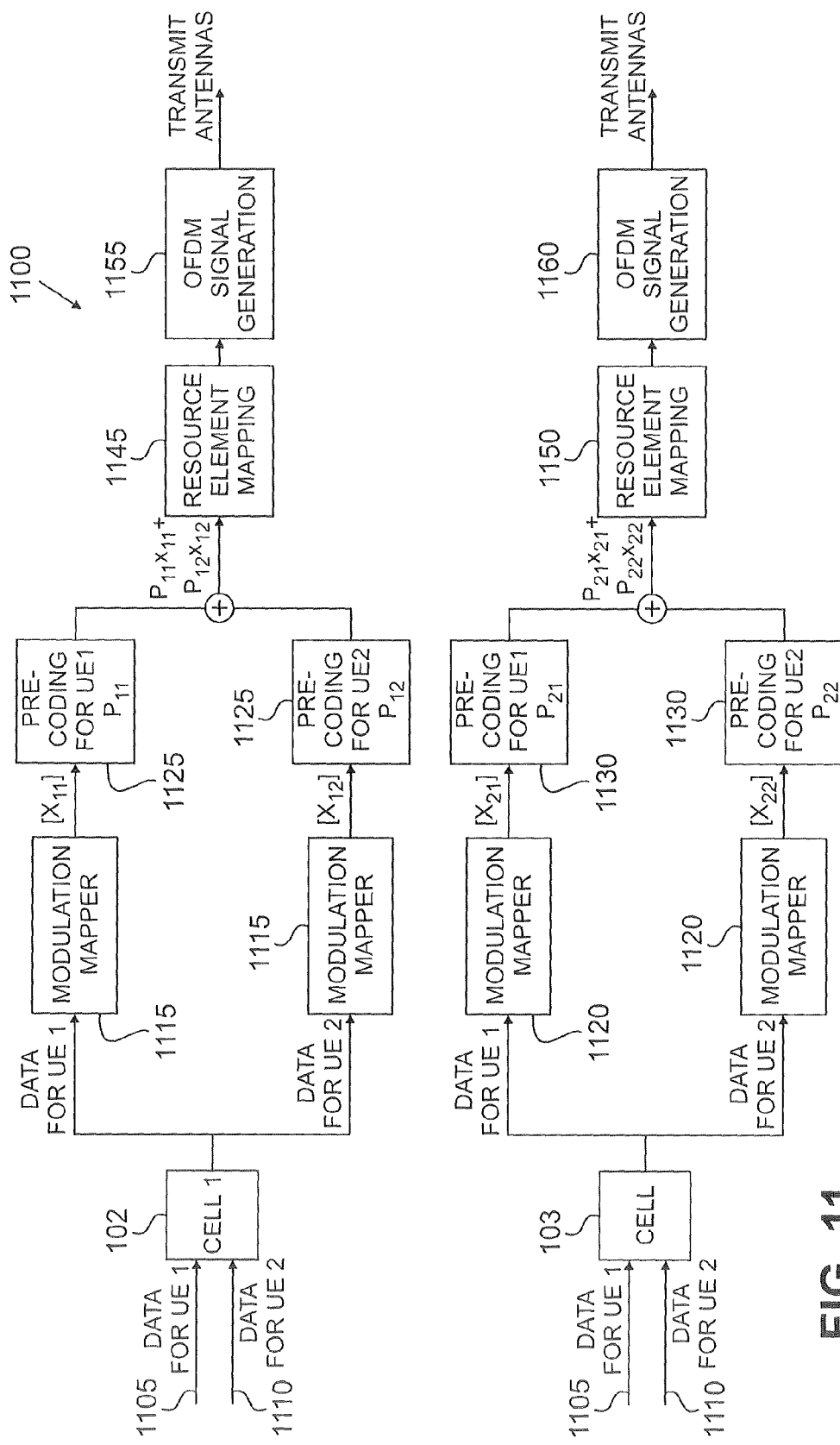
FIG. 11 illustrates an overview of the physical channel processing for spatial multiplexing according to embodiments of the present disclosure.

FIG. 11 illustrates an overview of the physical channel processing for spatial multiplexing according to embodiments of the present disclosure. The embodiment of the overview of the physical channel processing for spatial multiplexing 1100 shown in FIG. 11 is for illustration only. Other embodiments of the overview of the physical channel processing for spatial multiplexing 1100 could be used without departing from the scope of this disclosure.

A data stream 1105 for SS 116 and data stream 1110 for SS 115 reach BS 102. The modulation block 1115, 1120 maps the units (maybe bits for binary representation) into complex-valued modulation symbols. After the modulation mapper 1120, BS 102 chooses a precoder based on the estimated channel or channel knowledge for the wireless links to precode 1125, 1130 the channel for different UEs, SS 116 and SS 115. For example, BS 102 ("Cell 1") is treating SS 116 and SS 115 as its own serving UEs. BS 102 is serving SS 116 and SS 115 simultaneously using precoders $P_{11}$ and $P_{12}$. Similarly, BS 103 ("Cell 2") also treats SS 116 and SS 115 as its own serving UEs and use precoders $P_{21}$ and $P_{22}$. In the resource element mapping block 1145, 1150, the complex-valued symbols are mapped to resource elements. Then, the OFDM signal is generated 1155, 1160 based on the resource elements.

SS 116 and SS 115 each perform a multi-user spatial multiplexing receiver for each of the data streams from the BS 102 and BS 103. In general, a reverse operation of the transmitter side can be applied.

Figure 12:
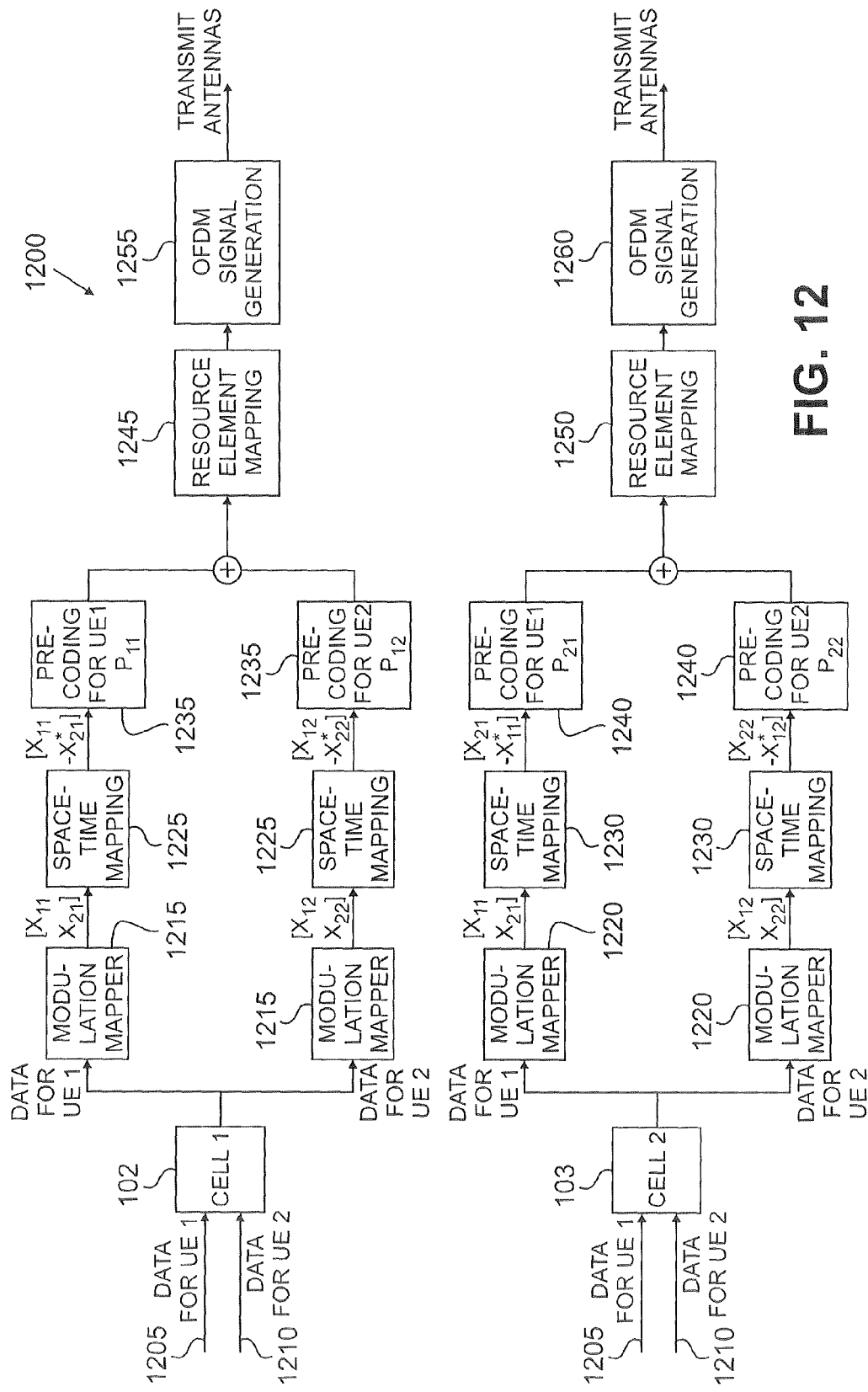
FIG. 12 illustrates an overview of the physical channel processing for Multi-Cell Transmit Diversity (TxD) according to embodiments of the present disclosure.

FIG. 12 illustrates an overview of the physical channel processing for Multi-Cell Transmit Diversity (TxD) according to embodiments of the present disclosure. The embodiment of the physical channel processing for Multi-Cell TxD 1200 shown in FIG. 12 is for illustration only. Other embodiments of the physical channel processing for Multi-Cell TxD 1200 could be used without departing from the scope of this disclosure.

In some embodiments, an intra-cell multi-user MIMO with inter-cell TxD is performed. Similar procedures will be performed as for the spatial multiplexing discussed herein above with respect to FIGS. 9, 10 and 11. For example, in intra-cell multi-user MIMO with inter-cell TxD, base stations divide the spectrum as illustrated in step 1005.

However, unlike in step 1010, in step 1010' for intra-cell multi-user MIMO with inter-cell TxD, SS 116 does not need to feedback, to the base stations, the channel knowledge related to the links. SS 116 only feeds back information related to CQI. However, as with spatial multiplexing, data for SS 116 and SS 115 is still needed to be shared between BS 102 and BS 103.

The data stream for SS 116 and data stream for SS 115 reach BS 102 and BS 103. The modulation block 1215, 1220 maps the units (maybe bits for binary representation) into complex-valued modulation symbols. [$x_{11}$ $x_{21}$] represents the two consecutive symbols in time intended for SS 116. [$x_{12}$ $x_{22}$] represents the two consecutive symbols in time intended for SS 115. These two symbols sets go through a diversity encoding process, such as, but not limited to standard space-time mapping, space-frequency mapping, and frequency shift transmit mapping. For example, the space-time mapping blocks 1225, 1230 can include a main function as shown in the matrix illustrated in FIG. 13. For a fixed input symbol sequence [$x_{11}$ $x_{21}$], BS 102 will output the first column of the above matrix while BS 103 will output the second column of the matrix. When the number of base stations in the cooperation system is N, a M by N space time codes can be used where a sequence of M consecutive symbols is processed at a time and each base station transmits one column of the space-time matrix. Then, after the Space-Time mapping block 1225, 1230, BS 102 chooses a precoder to precode 1235 the channel. Additionally, BS 103 chooses a precoder to precode 1240 the channel For example, BS 102 takes $x_{11}$ at time instant "1" and applies precoder $P_{11}$ for the data intended for SS 116. BS 102 take $P_{12}$ for the data intended for SS 115. Similarly, BS 103 uses $P_{21}$ to precode the data intended for SS 116 and $P_{22}$ to precode the data for SS 115. In the resource element mapping block 1245, 1250, the complex-valued symbols are mapped to resource elements. Then, the OFDM signal is generated 1255, 1260 based on the resource elements.

In step 1020', SS 116 receive the multiple signals. The received signal of SS 116 can be expressed by Equation 3:

$$Y_1(1) = H_{11}P_{11}x_{11} + H_{21}P_{21}x_{21} + H_{12}P_{12}x_{12} + H_{22}P_{22}x_{22} + N_1$$

$$Y_1(2) = -H_{11}P_{11}x_{21}^* + H_{21}P_{21}x_{11}^* - H_{12}P_{12}s_{22}^* + H_{22}P_{22}x_{12}^* + N_1 \quad [\text{Eqn. 3}]$$

In Equation 3, $Y_1(1)$ is the received signal of SS 116 at time slot "1" and $Y_1(2)$ is the received signal of SS 116 at time slot "2". For the system shown in FIGS. 9 and 12, where there are two base stations cooperating to send data to two UEs, SS 116 and SS 115 each wait two consecutive slots and perform a diversity decoding process, such as, but not limited to standard space-time block codes decoding, space-frequency block codes decoding, and frequency shift transmit diversity decoding. This requires maximum ratio combining at the receiver side.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a subscriber station capable of receiving communications via a preset frequency band from a plurality of cells, the present frequency band being divided into a multi-cell joint frequency band assigned to at least two cells and an individual cell frequency band assigned to each cell, the subscriber station comprising:
a transmitter configured to feedback identification information on at least two interfering cells and channel related information for the at least two interfering cells;
a receiver configured to receive at least two coordinated joint transmissions having a single frequency band, that are scheduled by the identified at least two interfering cells for the subscriber station based on the identification information and the channel related information from the at least two interfering cells,
wherein the single frequency band is allotted from the multi-cell frequency band.

2. The subscriber station as set forth in claim 1, wherein the identified at least two interfering cells jointly schedule the coordinated joint transmission.

3. The subscriber station as set forth in claim 1, wherein the identified at least two subscriber station is configured to request the coordinated joint transmissions.

4. The subscriber station as set forth in claim 3, wherein the request is based on a channel performance measurement.

5. The subscriber station as set forth in claim 3, wherein at least one of the identified at least two interfering cells is configured to accept or deny the request.

6. The subscriber station as set forth in claim 1, wherein the coordinated joint transmissions comprise a semi-statistical configuration of a frequency band.

7. The subscriber station as set forth in claim 1, wherein the identified at least two interfering cells are configured to jointly choose a precoding matrix.

8. The subscriber station as set forth in claim 1, wherein the subscriber station reports the channel related information jointly for the identified at least two interfering cells.

9. The subscriber station as set forth in claim 1, wherein the subscriber station reports the channel related information independently for the identified at least two interfering cells base stations.

10. The subscriber station as set forth in claim 1, wherein the subscriber station performs diversity decoding on the coordinated joint transmissions.

11. A wireless communications network comprising a plurality of base stations, each one of the base stations capable of wireless communications with a plurality of subscriber stations, at least two of the plurality of base stations comprising:
   a receiver configured to receive identification information on at least two interfering cells and channel related information for the at least two interfering cells from a subscriber station; and
   a controller configured to divide a preset frequency band utilized by each cell into a multi-cell joint frequency band and an individual cell frequency band, to allot a single frequency band of the multi-cell joint frequency band for joint transmissions, and to control the identified at least two interfering cells to transmit the joint transmissions using the single frequency band to the subscriber station.

12. The network as set forth in claim 11, wherein the identified at least interfering two base stations jointly schedule the joint transmissions.

13. The network as set forth in claim 11, wherein the joint transmissions are allocated in a portion of the preset frequency band.

14. The network as set forth in claim 11, wherein at least one of the identified interfering base stations receives a request for the joint transmissions.

15. The network as set forth in claim 11, wherein the joint transmissions are a multi-user multiple input multiple output transmission.

16. The network as set forth in claim 11, wherein the identified at least two interfering base stations jointly choose a precoding matrix.

17. The network as set forth in claim 16, wherein at least one of the identified at least two base interfering stations receives a report regarding a channel related information jointly for at least two base stations.

18. The network as set forth in claim 11, wherein the identified at least two interfering base stations independently choose a precoding matrix.

19. The network as set forth in claim 18, wherein at least one of the identified at least two interfering base stations receives a report regarding a channel related information independently for the at least two interfering base stations.

20. The network as set forth in claim 11, wherein at least one of the identified at least two interfering base stations receives a feedback signal from the subscriber station, the feedback signal comprising the channel related information.

21. The network as set forth in claim 11, wherein at least one of the identified at least two interfering base stations performs diversity encoding on a number of streams in the coordinated joint transmissions.

22. For use in a wireless communications network, a method for interference mitigation, the method comprising:
   receiving identification information on at least two interfering base stations and channel related information for the at least two interfering base stations from a subscriber station;
   dividing a preset frequency band utilized by a plurality of base stations into a multi-cell joint frequency band and an individual cell frequency band;
   coordinating, by a first base station of the identified at least two interfering base stations, a joint transmission to the subscriber station with a second base station of the identified at least two interfering base stations;
   allocating a single frequency band of the multi-cell joint frequency band for the joint transmission;
   transmitting, by the first base station, the joint transmission at a substantially same time and frequency that the joint transmission is transmitted by the second base station to the at least one subscriber station.

23. The method as set forth in claim 22, further comprising receiving a request, from the at least one subscriber station, for the joint transmission.

24. The method as set forth in claim 22, further comprising transmitting the joint transmission to a plurality of subscriber stations utilizing a multiple input multiple output transmission.

25. The method as set forth in claim 22, further comprising selecting, by the subscriber station, a first channel related information for the first base station independent of a second channel related information for the second base station.

26. The method as set forth in claim 22, further comprising selecting, by the subscriber station, channel related information for a joint channel of the first and second base stations.

* * * * *